United States Patent
Wycoff et al.

(10) Patent No.: US 11,890,809 B2
(45) Date of Patent: Feb. 6, 2024

(54) THREE-DIMENSIONAL PRINTING

(71) Applicant: Hewlett-Packard Development Company, L.P., Spring, TX (US)

(72) Inventors: Kyle Wycoff, Palo Alto, CA (US); Adekunle Olubummo, Palo Alto, CA (US); Maria del Carmen Querol Esparch, Sant Cugat del Valles (ES); Laurent Herschke, Sant Cugat del Valles (ES); Lihua Zhao, Palo Alto, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 115 days.

(21) Appl. No.: 17/298,852

(22) PCT Filed: Jul. 17, 2019

(86) PCT No.: PCT/US2019/042221
§ 371 (c)(1),
(2) Date: Jun. 1, 2021

(87) PCT Pub. No.: WO2021/010995
PCT Pub. Date: Jan. 21, 2021

(65) Prior Publication Data
US 2022/0127477 A1    Apr. 28, 2022

(51) Int. Cl.
| | | |
|---|---|---|
| *B29C 64/165* | (2017.01) | |
| *B33Y 10/00* | (2015.01) | |
| *B33Y 30/00* | (2015.01) | |
| *B33Y 70/00* | (2020.01) | |
| *C09D 11/037* | (2014.01) | |
| *C09D 11/102* | (2014.01) | |
| *B29K 23/00* | (2006.01) | |
| *B22F 1/054* | (2022.01) | |

(52) U.S. Cl.
CPC ............ *B29C 64/165* (2017.08); *B33Y 10/00* (2014.12); *B33Y 30/00* (2014.12); *B33Y 70/00* (2014.12); *C09D 11/037* (2013.01); *C09D 11/102* (2013.01); *B22F 1/054* (2022.01); *B29K 2023/00* (2013.01)

(58) Field of Classification Search
None
See application file for complete search history.

(56) References Cited

U.S. PATENT DOCUMENTS

| | | | |
|---|---|---|---|
| 5,721,315 A | 2/1998 | Evans et al. | |
| 7,220,484 B2 | 5/2007 | Ton-That et al. | |
| 7,767,132 B2 | 8/2010 | Patel et al. | |
| 10,240,066 B2 | 3/2019 | Rolland et al. | |
| 2007/0241482 A1* | 10/2007 | Giller | B29C 64/165 |
| | | | 264/494 |
| 2015/0080486 A1 | 3/2015 | Kasowski | |
| 2018/0086887 A1 | 3/2018 | Beek et al. | |
| 2020/0247995 A1* | 8/2020 | Marchese | B33Y 70/10 |

FOREIGN PATENT DOCUMENTS

| | | |
|---|---|---|
| EP | 2186637 B1 | 5/2012 |
| WO | 2019/108201 A1 | 6/2019 |
| WO | WO 2019/108201 * | 6/2019 |
| WO | WO 2020/169548 * | 8/2020 |

OTHER PUBLICATIONS

Zhang et al. Grafting of Glycidyl Methacrylate onto Ethylene-Propylene Copolymer: Preparation and CharacterizationJ. Applied Polymer Sci 61, 2253-2257 (Year: 1996).*
Zhang et al. Thermal Analysis of Ethylene-Propylene CopolymerGrafted-Glycidyl Methacrylate Journal of Applied Polymer Science, vol. 62, 1933-1939 (Year: 1996).*

* cited by examiner

*Primary Examiner* — Robert T Butcher
(74) *Attorney, Agent, or Firm* — HP Inc. Patent Department

(57) ABSTRACT

A 3D printing kit can include a powder bed material comprising from about 80 wt % to 100 wt % polymer particles, a fusing agent to selectively apply to the powder bed material, and a hardener to selectively apply to the powder bed material. The polymeric particles can include a polyalkylene backbone with both ethylene and propylene polymerized monomeric units with from 2 mol % to 15 mol % of the polymerized monomeric units include a grafted side chain having an epoxide moiety. The fusing agent can include water and a radiation absorber that absorbs electromagnetic energy and converts the electromagnetic energy to heat. The hardener can be present in the fusing agent or can be included in a hardening agent that is separate from the fusing agent.

15 Claims, 3 Drawing Sheets

THREE-DIMENSIONAL PRINTING

BACKGROUND

Methods of three-dimensional (3D) digital printing, a type of additive manufacturing, have continued to be developed in recent years. 3D printing technology can shorten the product development cycle by allowing rapid creation of prototype models for reviewing and testing. Unfortunately, the concept has been somewhat limited with respect to commercial production capabilities because the range of materials used in 3D printing is likewise limited. Nevertheless, several commercial sectors such as aviation, the medical industry, and more and more other industries are benefitting from the ability to rapidly prototype and/or customize parts for customers.

DETAILED DESCRIPTION

Figure 1A:
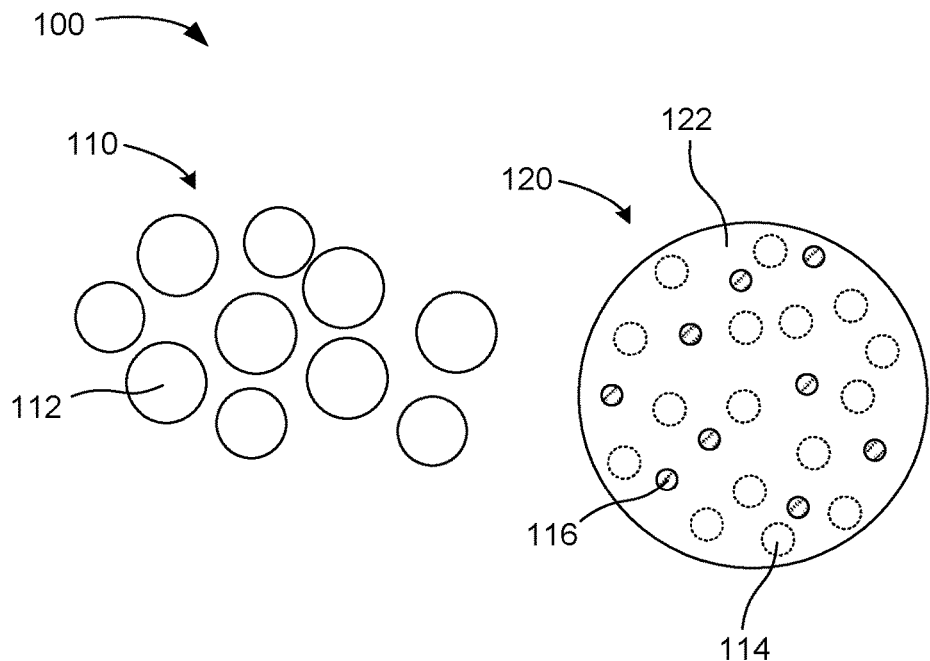
FIG. 1A schematically illustrates an example 3D printing kit in accordance with the present disclosure.

The present disclosure relates to three-dimensional (3D) printing kits, 3D printing methods, and 3D printing systems in accordance with the present disclosure. In one example, a 3D printing kit can include a powder bed material comprising from about 80 wt % to 100 wt % polymer particles, a fusing agent to selectively apply to the powder bed material, and a hardener to selectively apply to the powder bed material. The polymeric particles can include a polyalkylene backbone with both ethylene and propylene polymerized monomeric units, wherein from 2 mol % to 15 mol % of the polymerized monomeric units include a grafted side chain having an epoxide moiety. The fusing agent includes water and a radiation absorber that absorbs electromagnetic energy and converts the electromagnetic energy to heat. The hardener can be present in the fusing agent and/or can be included in a hardening agent that is separate from the fusing agent. The polymeric particles can have a weight average molecular weight from about 10,000 Mw to about 75,000 Mw and an average particle size from about 10 μm to about 150 μm. In some examples, the polymeric particles can have a weight average molecular weight from about 20,000 Mw to about 50,000 Mw and an average particle size from about 20 μm to about 75 μm. The radiation absorber can be, for example, a metal dithiolene complex, carbon black, a near-infrared absorbing dye, a near-infrared absorbing pigment, metal nanoparticles, a conjugated polymer, or a combination thereof. If the hardener is present in a hardening agent (instead of or in addition to its presence in the fusing agent), the hardening agent can include water and from about 5 wt % to 50 wt % of the hardener. The hardener can be selected from an amine hardener, a thiol hardener, an anhydride hardener, an isocyanate hardener, or a combination thereof. The 3D printing kit can further include a detailing agent that includes a detailing compound to reduce the temperature of the powder bed material onto which the detailing agent is applied. In one example, from 3 mol % to 10 mol % of the polymerized monomeric units of the polymeric particles can include the grafted side chain of the epoxide moiety. In further detail, the polymeric particles can be a reaction product of a polypropylene-b-polyethylene random copolymer and a glycidyl (meth)acrylate.

In another example, a method of making a 3D printed article can include iteratively applying individual build material layers of polymer particles to a powder bed, and based on a 3D object model, selectively jetting a fusing agent onto the individual build material layers. Also, based on the 3D object model, the method includes selectively jetting a hardener onto the individual build material layers to cause epoxide moieties to open and become crosslinked. The fusing agent in this example includes water and a radiation absorber that absorbs electromagnetic energy and converts the electromagnetic energy to heat. The polymeric particles in this example include a polyalkylene backbone with both ethylene and propylene polymerized monomeric units where from 2 mol % to 15 mol % of the polymerized monomeric units include a grafted side chain having an epoxide moiety. The hardener in this example can be present in the fusing agent or separately jetted onto the individual build material layers as part of a separate hardening agent. In further detail, the method can include exposing the powder bed to electromagnetic energy to selectively fuse the polymer particles in contact with the radiation absorber at individual build material layers to form a 3D printed article. In one more specific example, the 3D printed article formed can be both physically fused by thermoplastic melting of particles and chemically crosslinked at opened epoxy groups. In still further detail, the 3D printed article may have a Young's Modulus 3,000 MPa or more.

In another example, a 3D printing system can include a powder bed material including from about 80 wt % to 100 wt % polymer particles, the polymeric particles including a polyalkylene backbone with both ethylene and propylene polymerized monomeric units, wherein from 2 mol % to 15 mol % of the polymerized monomeric units include a grafted side chain having an epoxide moiety. The 3D printing system can also include a fusing agent to selectively apply to the powder bed material, wherein the fusing agent comprises water and a radiation absorber that absorbs electromagnetic energy and converts the electromagnetic energy to heat. A hardener can also be present to selectively apply to the powder bed material. The hardener is present in the fusing agent or is included in a hardening agent that is separate from the fusing agent. The 3D printing system can also include a radiant energy source positioned to expose a layer of powder bed material to the electromagnetic energy to selectively fuse the polymer particles in contact with the radiation absorber and thereby form a 3D printed article that is thermally fused and chemically crosslinked. In one example, the hardening agent may be present and included in the hardening agent.

It is noted that when discussing the 3D printing kits, the 3D printing systems, and the methods of 3D printing herein, such discussions can be considered applicable to one another whether or not they are explicitly discussed in the context of that example. Thus, for example, when discussing a hardener in the context of the 3D printing kit, such disclosure is also relevant to and directly supported in the context of the 3D printing system and/or the method of 3D printing, and vice versa. It is also understood that terms used herein will take on their ordinary meaning in the relevant technical field unless specified otherwise. In some instances, there are terms defined more specifically throughout the specification or included at the end of the present specification, and thus, these terms have a meaning consistent with these more specific definitions.

3D Printing Kits

The present disclosure relates in some examples to three-dimensional (3D) printing kits. FIG. 1A, for example, provides a schematic illustration of one example 3D printing kit 100 in accordance with examples of the present disclosure. The 3D printing kit includes a powder bed material 110 including polymer particles 112 and a fusing agent 120 including a radiation absorber 114 to selectively apply to the powder bed material. The polymer particles can be included in the powder bed material at from about 80 wt % to 100 wt % by weight (of the powder bed material), and the polymeric particles can also include a polyalkylene backbone with both ethylene and propylene polymerized monomeric units, as well as from 2 mol % to 15 mol % of the polymerized monomeric units including a grafted side chain having an epoxide moiety. The fusing agent can include water 122 (e.g., in the form of an aqueous liquid vehicle in some examples), and in addition to the radiation absorber in this example, can also include a hardener that can be used to crosslink epoxide moieties.

Figure 1B:
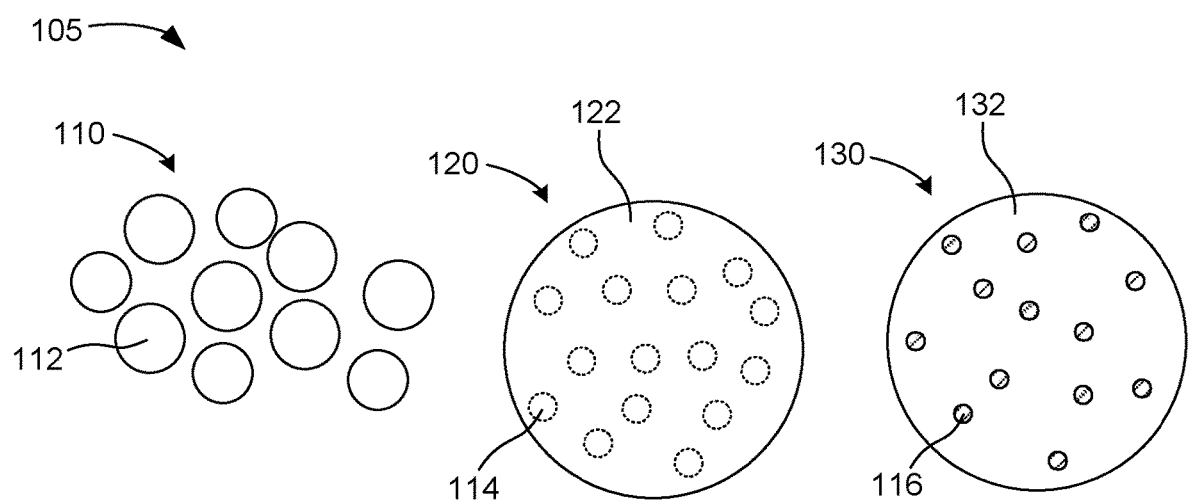
FIG. 1B schematically illustrates an alternative example 3D printing kit in accordance with the present disclosure.

As shown by way of example in FIG. 1B, a 3D printing kit 105 can include a powder bed material 110 including polymer particles 112 and a fusing agent 120 including a radiation absorber 114 to selectively apply to the powder bed material. The polymer particles can be included in the powder bed material at from about 80 wt % to 100 wt % by weight (of the powder bed material), and the polymeric particles can also include a polyalkylene backbone with both ethylene and propylene polymerized monomeric units, as well as from 2 mol % to 15 mol % of the polymerized monomeric units including a grafted side chain having an epoxide moiety. The fusing agent can likewise include water 122 (e.g., in the form of an aqueous liquid vehicle in some examples). However, in this example, the hardener 116 is present in the hardening agent that is a separate fluid than the fusing agent. The hardener can be used to cause crosslinking of the epoxide moieties, but in this instance, the hardener can be selectively applied to the powder bed material independently relative to the fusing agent and the radiation absorber carried therein.

In either of these examples shown at FIGS. 1A and 1B, the 3D printing kit can include other fluid agents, such as multiple fusing agent formulations, multiple hardening agent formulations, detailing agent(s), coloring agent (with pigment and/or dye), etc.

In some examples, the 3D printing kit can include the powder bed material and the fusing agent (or separate fusing agent and hardening agent) packaged together. In certain examples, the powder bed material can be in the form of a container or bag of loose powder material. In other examples, the polymeric powder can be in a cartridge designed to fit in a specific 3D printing system. Similarly, the fusing agent and/or the hardening agent can be in a cartridge designed for use with a specific 3D printing system, or it can be in another package, such as a bottle(s).

In some examples, the polymeric powder can be capable of being formed into 3D printed parts with a resolution of about 20 μm to about 100 μm, about 30 μm to about 90 μm, or about 40 μm to about 80 μm. As used herein, "resolution" refers to the size of the smallest feature that can be formed on a 3D printed part. The polymeric powder can form layers from about 20 μm to about 100 μm thick, allowing the fused layers of the printed part to have roughly the same thickness. This can provide a resolution in the z-axis (depth) direction of about 20 μm to about 100 μm.

Methods of 3D Printing

Figure 2:
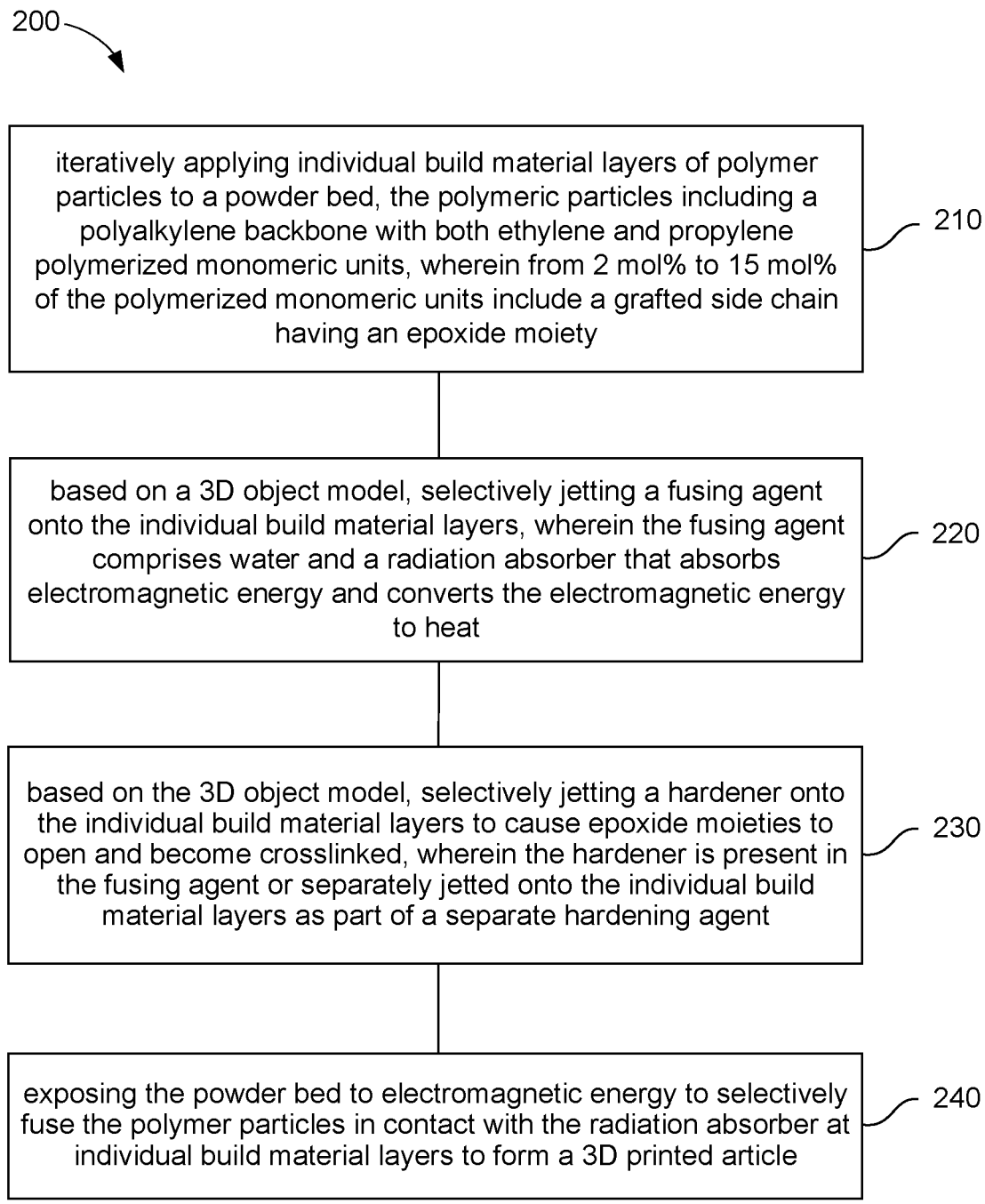
FIG. 2 illustrates an example method for 3D printing in accordance with the present disclosure.

Examples of the present disclosure also include 3D printing methods, such as that shown by way of example in FIG. 2 at 200. In this example, the method can include iteratively applying 210 individual build material layers of polymer particles to a powder bed, the polymeric particles including a polyalkylene backbone with both ethylene and propylene polymerized monomeric units, wherein from 2 mol % to 15 mol % of the polymerized monomeric units include a grafted side chain having an epoxide moiety. The method can further include, based on a 3D object model, selectively jetting 220 a fusing agent onto the individual build material layers, wherein the fusing agent comprises water and a radiation absorber that absorbs electromagnetic energy and converts the electromagnetic energy to heat. Also, based on the 3D object model, the method can include selectively jetting 230 a hardener onto the individual build material layers to cause epoxide moieties to open and become crosslinked, wherein the hardener is present in the fusing agent or separately jetted onto the individual build material layers as part of a separate hardening agent. The method further may include exposing 240 the powder bed to electromagnetic energy to selectively fuse the polymer particles in contact with the radiation absorber at individual build material layers.

In additional detail, the 3D printing methods can include crosslinking epoxide groups that are initially grafted onto side chains of a polyethylene/polypropylene backbone to provide crosslinked 3D printed articles. For example, a glycidyl methacrylate or allyl glycidyl ether can be grafted onto the polyethylene/polypropylene backbone. A hardener, such as an amine or a polyfunctional monomer, can be used as the hardener (or curing agent). The epoxide moieties can be linked together through the reactive sites of the curing agent, for example. Amine curing agents or hardeners, for example, may generally have more than one group amine per molecule, so that crosslinking may result in the formation of a covalent bonded network. That stated, the curing agent selection may be based in part on the target mechanical and physical properties to be achieved, environmental resistance, pot life, viscosity, and/or processing (liquid or solid), etc.

3D Printing Systems

Figure 3:
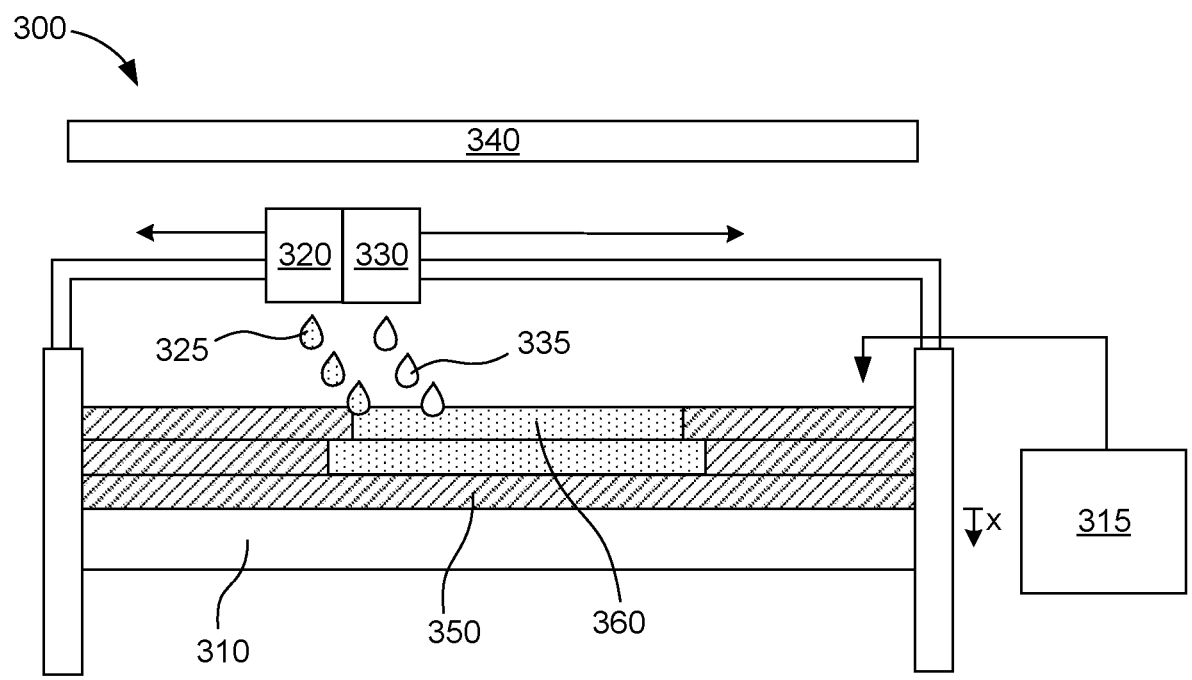
FIG. 3 schematically illustrates an example 3D printing system in accordance with the present disclosure.

FIG. 3 illustrates an example 3D printing system 300 in accordance with the present disclosure. In this example, the system includes a build platform 310 supporting a powder bed material 350. A partially printed article 360 is shown that includes fused and crosslinked powder bed material. In building a three-dimensional article or part, a layer of fresh build material powder is supplied from a build material supply 315 over the top of the partially printed article. Fusing agent 325, including a radiation absorber and in some examples a hardener, is then applied to the layer of fresh build material from a fusing agent ejector or jet 320. The fusing agent jet can be moveable within the 3D printer so that the fusing agent jet moves across the powder bed to apply the fusing agent at specific locations based on a 3D object model. In this example, a hardening agent 335 is also shown that contains a hardener for promoting crosslinking of the polymeric particles of the powder bed material. The hardening agent can be applied before or after jetting the fusing agent, but in some examples, the hardening agent may be applied after the fusing agent is applied and after the powder bed material is brought to a molten or fusible state by an electromagnetic energy source 340 that emits electromagnetic energy sufficient to cause the radiation absorber to heat up the powder bed material for thermal fusing. By crosslinking as the polymeric powder is melting or after it has melted, but before cooling (or before any appreciable cooling), the crosslinking can provide the benefit of reducing polymer crystallization. For example, the crosslinking occurring while the polymeric particles are in a molten state can retard the mobility of the chains, and thus, resist some recrystallization that may have otherwise occurred.

As used herein, terms such as "jet," "eject," "jetting," ejecting," "ejector," or the like can be used interchangeably, and refers to digital jetting or ejection of various compositional agents described herein. Jetting architecture or ejectors can include thermal or piezo architecture with printheads with printing orifices or openings suitable for ejection of small droplets of fluid. In some examples, the fluid droplet size can be from about 2 picoliters to about 100 picoliters, from about 2 picoliters to about 50 picoliters from about 2 picoliters to about 40 picoliters, from about 2 picoliters to about 30 picoliters, from about 2 picoliters to about 20 picoliters, from about 2 picoliters to about 10 picoliters, from about 3 picoliters to about 20 picoliters, or from about 3 picoliters to about 10 picoliters, or from about 3 picoliters to about 8 picoliters, etc.

In further detail regarding the electromagnetic energy applied by the electromagnetic energy source 340 to the powder bed material (with the fusing agent jetted thereon), such energy can be in the form of infrared energy, near-infrared energy, visible light energy, or other wavelength of energy suitable for fusing the powder build material in the presence of the fusing agent. Suitable electromagnetic energy sources can be, for example, in the form of fusing lamps, such as infrared lamps, and halogen lamps. The fusing lamp can be a stationary lamp or a moving lamp. For example, the lamp can be mounted on a track to move horizontally across the powder bed. Such a fusing lamp can make multiple passes over the powder bed material depending on the amount of exposure determined for use to fuse individual layers or groups of layers. The fusing lamp can irradiate the entire powder bed area with a substantially uniform amount of energy, or can more selectively irradiate the powder bed area. Either way, the presence of the fusing agent in certain locations within the powder bed area impacts whether a given portion of powder bed material becomes fused. This can selectively fuse the portions printed with the fusing agent while leaving the unprinted portions of the polymer powder below the fusing temperature.

In one example, the fusing lamp can be matched with the radiation absorber in the fusing agent so that the source emits wavelengths of light that match the peak absorption wavelengths of the radiation absorber. A radiation absorber with a narrow peak at a particular near-infrared wavelength can be used with an electromagnetic radiation fusing source that emits a narrow range of wavelengths at approximately the peak wavelength of the fusing agent. Similarly, a radiation absorber that absorbs a broad range of near-infrared wavelengths can be used with an electromagnetic radiation fusing source that emits a broad range of wavelengths. Matching the radiation absorber and the electromagnetic radiation fusing source in this way can increase the efficiency of fusing the powder bed material including the composite fiber particles with the fusing agent printed thereon, while the unprinted powder bed material does not absorb as much light and remains at a lower temperature.

In further detail, the 3D printing system can also include preheaters for preheating the powder bed material to a temperature near (but short of) its fusing temperature. In one example, the system can include a print bed heater to heat the build platform 310. In other examples, there can be overhead heaters that apply heat to the powder build material from above, such as radiant heaters, forced air heaters, etc. In some examples, the print bed heater and/or an overhead heater, for example, can apply heat to the powder bed material at a temperature from about 50° C. to about 250° C., for example. In still other examples, the build material supply 315 can also include a supply heater to preheat the powder build material supply prior to spreading a layer of powder bed material on the build platform or a previously applied layer of powder bed material, for example. The supply heater can heat the supply to a temperature from about 80° C. to about 140° C., for example. With these temperatures as guidelines, it is noted that the preheat temperature(s) used can depend on the specific polymeric particulates used in the powder bed material. Keeping the powder bed material near its fusing temperature may allow for less electromagnetic energy to be applied to bring the powder bed material (in contact with the fusing agent) to its fusing temperature, for example. In some other examples, various heating apparatuses, such as the print bed heater, can also be used to anneal the 3D printed article after formation.

Depending on the amount of radiation absorber present in the powder bed material, the absorbance of the radiation absorber, the preheat temperature, and the fusing temperature of the specific polymeric particles present, an appropriate amount of radiation can be supplied from the electromagnetic energy source 340. In some examples, the fusing lamp can irradiate individual layers for about 0.1 seconds to about 10 seconds per pass. In further examples, a fusing lamp can move across the powder bed at a rate of about 1 inch per second to about 60 inches per second to fuse the various layers. In still further examples, the fusing lamp can move across the powder bed at a rate of about 5 inches per second to about 20 inches per second. The energy applied to the powder bed material can be pulsed energy, or continuous energy. Example energy applied can be, for example, at from 5,000 $J/mm^3$ to 50,000 $J/mm^3$, 5,000 $J/mm^3$ to 30,000 $J/mm^3$, 5,000 $J/mm^3$ to 20,000 $J/mm^3$, 7,500 $J/mm^3$ to 50,000 $J/mm^3$, 10,000 $J/mm^3$ to 30,000 $J/mm^3$, etc.

Powder Bed Material and Hardener

Polyalkylenes, such as the polyalkylenes of the backbone of the polymeric particles described herein, can be crosslinked, but may involve the generation of macroradicals from a radical initiator. These radicals, in addition to providing crosslinking, can result in chain scission, which can lead to decreases in weight average molecular weight of the crosslinked polymer and/or a decrease in molecular weight and poor mechanical properties in some instances. Scission may be avoidable by the addition of a co-agent to a peroxide initiator during crosslinking. However, many peroxides have a short half-life and as a result, and thus formulating particularly stable inkjet formulations, particularly for thermal ejection, may present certain issues. By grafting the epoxide moieties to the polyalkylene backbone in the presence of a radical initiator and a co-agent or a copolymer can reduce chain scission. Furthermore, an amine or other type of hardener, e.g. aliphatic or aromatic amine and/or primary or secondary amines, phenols, carboxylic acids, thiols, anhydrides, and the like, can be ejected from thermal inkjet architecture or other type of fluid ejector, e.g., piezoelectric, onto the powder bed material on a layer by layer basis, thus selectively causing crosslinking of the polymeric particles, as the strained three-membered ring structure of the grafted epoxide side groups make them thermodynamically unstable and prone to react with nucleophilic and electrophilic reagents. Thus, the wide variety of organic compounds having active hydrogen atoms can be used to promote epoxide crosslinking. Thus, by providing grafted epoxy moieties on a polyalkylene backbone, crosslinking of chains can occur when a polyfunctional hardener is jetted onto the polymer, e.g., the molten polymer due to application of electromagnetic energy in the presence of a radiation absorber.

Formula I below provides an example polyalkylene backbone with both ethylene groups and propylene groups assembled randomly, and which is reacted with a glycidyl methacrylate to graft epoxide-containing side chains onto the polyalkylene backbone, as shown by example below:

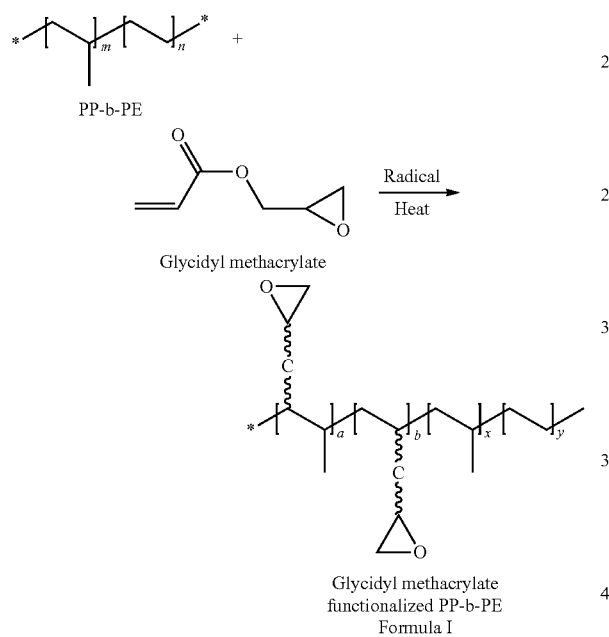

In this example, m and n are selected at about a 1:10 to about a 10:1 molar ratio, and (m)+(n) collectively can be integers from about 4 to about 60, from about 5 to about 50, or from about 10 to about 40, for example. The polymeric particles formed can include polymer chains having a weight average molecular weight from about 8,000 Mw to about 80,000 Mw, from about 10,000 Mw to about 50,000 Mw, or from about 15,000 Mw to about 40,000 Mw. The epoxide-grafted or modified side chain in this particular example is provided by a glycidyl methacrylate to form a glycidyl methacrylate-functionalized PP-b-PE, but could be other epoxide-grafted side chain groups. As shown, epoxide-grafted side chains are shown as present on propylene moieties (a) and epoxide-grafted side chains are also shown as present on ethylene moieties (b). Furthermore, there can also be propylene moieties that remain unmodified (x) as well as ethylene moieties that remain unmodified (y). In some examples from about 2% to about 15% of the monomeric units (propylene and ethylene groups collectively) can be modified with an epoxide side chain, as shown by example at locations (a) and (b). Thus, (m) is represented in the reaction product of Formula I as an epoxy modified propylene moiety at (a) and an unmodified propylene moiety at (x), and n is represented in the reaction product of Formula I as an epoxy-modified ethylene moiety at (b) and an unmodified ethylene moiety at (y). As described, (a)+(b) can be 2% to 15% of the monomeric units in the polymer, but can also be from 3% to 10%, or from 4% to 8% of the monomeric units in the polymer, for example.

Formula II below provides an example polyalkylene backbone with grafted epoxide-containing side chains (such as that formed in Formula I) both before and after crosslinking upon reaction with an amine or other hardener. The crosslinked polymer is shown by example only, and notably, only shows a portion of how some crosslinking may occur, as crosslinking reactions can be somewhat random.

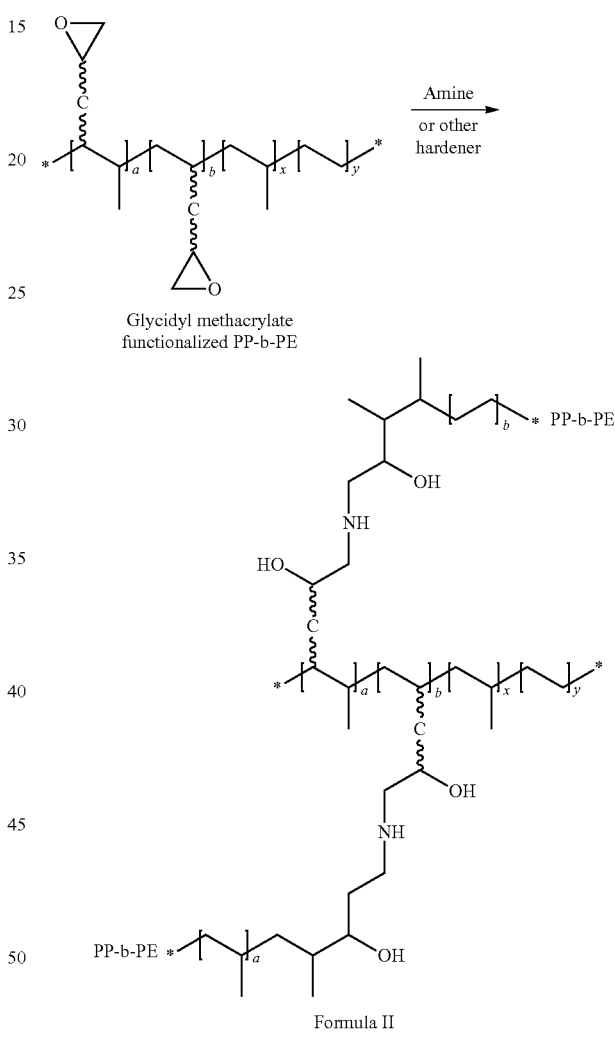

In Formula II, a partial view of the crosslinked polymer is shown as the reaction product after crosslinking in the presence of a hardener, e.g., amine. In this example, a, b, x, and y are shown for continuity between Formula I and Formula II, and thus, these variables may have the same values as set forth in Formula I initially, except that as a crosslinked polymer, the polymeric structure and molecular weight of the crosslinked polymer as a whole may be different.

In accordance with examples herein, the 3D printing kits, 3D printing methods, and 3D printing systems that utilize the technology described herein can result in the production of printed articles with high strength due to both thermal fusion and chemical crosslinking, with mechanical strengths of 3,000 MPa or more, e.g. 3,000 MPa to 100,000 MPa, 3,000 MPa to 50,000 MPa, 3,000 MPa to 20,000 MPa, 3,000 MPA to 10,000 MPa, 3,000 MPa to 6000 MPa, etc. The polymeric particles of the powder bed material can have a particle size from about 10 μm to about 125 μm, from about 10 μm to about 100 μm, from about 20 μm to about 80 μm, or from about 25 μm to about 75 μm, for example.

Fusing Agents

To thermally fuse the powder bed material, and particularly the epoxide-grafted polyalkylene polymeric particles, the temperature of the polymer can be raised by the introduction of electromagnetic energy to a layer of the powder bed material. The electromagnetic energy can interact with a radiation absorber that was ejected at certain locations onto or into the layer of powder bed material, and the interaction between the electromagnetic energy and radiation absorber generates heat sufficient to raise the temperature of the powder bed material to cause the powder to become fused. The radiation absorber can be delivered in a fusing agent formulation by thermal or other ejection technologies.

The radiation absorber can be colored or colorless. In various examples, the radiation absorber can be a metal dithiolene complex, carbon black, a near-infrared absorbing dye, a near-infrared absorbing pigment, metal nanoparticles, a conjugated polymer, or a combination thereof, or combinations thereof. Examples of near-infrared absorbing dyes include aminium dyes, tetraaryldiamine dyes, cyanine dyes, pthalocyanine dyes, dithiolene dyes, and others. In further examples, the fusing agent can be a near-infrared absorbing conjugated polymer such as poly(3,4-ethylenedioxythiophene)-poly(styrenesulfonate) (PEDOT:PSS), a polythiophene, poly(p-phenylene sulfide), a polyaniline, a poly(pyrrole), a poly(acetylene), poly(p-phenylene vinylene), polyparaphenylene, or combinations thereof. As used herein, "conjugated" refers to alternating double and single bonds between atoms in a molecule. Thus, "conjugated polymer" refers to a polymer that has a backbone with alternating double and single bonds. In many cases, the radiation absorber can have a peak absorption wavelength in the range of about 800 nm to about 1400 nm.

A variety of near-infrared pigments can also be used. Non-limiting examples can include phosphates having a variety of counterions such as copper, zinc, iron, magnesium, calcium, strontium, the like, and combinations thereof. Non-limiting specific examples of phosphates can include $M_2P_2O_7$, $M_4P_2O_9$, $M_5P_2O_{10}$, $M_3(PO_4)_2$, $M(PO_3)_2$, $M_2P_4O_{12}$, and combinations thereof, where M represents a counterion having an oxidation state of +2, such as those listed above or a combination thereof. For example, $M_2P_2O_7$ can include compounds such as $Cu_2P_2O_7$, $Cu/MgP_2O_7$, $Cu/ZnP_2O_7$, or any other suitable combination of counterions. It is noted that the phosphates described herein are not limited to counterions having a +2 oxidation state. Other phosphate counterions can also be used to prepare other suitable near-infrared pigments.

Additional near-infrared pigments can include silicates. Silicates can have the same or similar counterions as phosphates. One non-limiting example can include $M_2SiO_4$, $M_2Si_2O_6$, and other silicates where M is a counterion having an oxidation state of +2. For example, the silicate $M_2Si_2O_6$ can include $Mg_2Si_2O_6$, $Mg/CaSi_2O_6$, $MgCuSi_2O_6$, $Cu_2Si_2O_6$, $Cu/ZnSi_2O_6$, or other suitable combination of counterions. It is noted that the silicates described herein are not limited to counterions having a +2 oxidation state. Other silicate counterions can also be used to prepare other suitable near-infrared pigments.

A dispersant can be included in some examples. Dispersants can help disperse the radiation absorbing pigments described above. In some examples, the dispersant itself can also absorb radiation. Non-limiting examples of dispersants that can be included as a radiation absorber, either alone or together with a pigment, can include polyoxyethylene glycol octylphenol ethers, ethoxylated aliphatic alcohols, carboxylic esters, polyethylene glycol ester, anhydrosorbitol ester, carboxylic amide, polyoxyethylene fatty acid amide, poly(ethylene glycol) p-isooctyl-phenyl ether, sodium polyacrylate, and combinations thereof.

The amount of radiation absorber in the fusing agent can vary depending on the type of radiation absorber. In some examples, the concentration of radiation absorber in the fusing agent can be from about 0.1 wt % to about 20 wt %. In one example, the concentration of radiation absorber in the fusing agent can be from about 0.1 wt % to about 15 wt %. In another example, the concentration can be from about 0.1 wt % to about 8 wt %. In yet another example, the concentration can be from about 0.5 wt % to about 2 wt %. In a particular example, the concentration can be from about 0.5 wt % to about 1.2 wt %. In one example, the radiation absorber can have a concentration in the fusing agent such that after the fusing agent is printed onto the electroactive polymer powder, the amount of radiation absorber in the electroactive polymer powder can be from about 0.0003 wt % to about 10 wt %, or from about 0.005 wt % to about 5 wt %, with respect to the weight of the electroactive polymer powder.

As mentioned, in some examples, the fusing agent can also carry the compound that acts as a hardener for the epoxide side groups, or alternatively, the hardener can be carried by a separate formulation, such as a hardening agent formulation.

Other Fluid Agents

In some examples, there can be other fluid agents in the 3D printing kit, such as additional fusing agent formulations, additional hardening agent formulations, detailing agent(s), coloring agent (with pigment and/or dye), etc. A coloring agent can be used to add color to the 3D printed article on a layer by layer basis or at specific locations during the build.

In other examples, the 3D printing kit may include a detailing agent. The detailing agent can include a detailing compound. The detailing compound can be capable of reducing the temperature of the powder bed material onto which the detailing agent is applied. In some examples, the detailing agent can be printed around the edges of the portion of the powder that is printed with the fusing agent. The detailing agent can increase selectivity between the fused and unfused portions of the powder bed by reducing the temperature of the powder around the edges of the portion to be fused.

In some examples, the detailing compound can be a solvent that evaporates at the temperature of the powder bed. In some cases the powder bed can be preheated to a preheat temperature within about 10° C. to about 70° C. of the fusing temperature of the polymer powder. Depending on the type of polymer powder used, the preheat temperature can be in the range of about 90° C. to about 200° C. or more. The detailing compound can be a solvent that evaporates when it comes into contact with the powder bed at the preheat temperature, thereby cooling the printed portion of the powder bed through evaporative cooling. In certain examples, the detailing agent can include water, co-solvents, or combinations thereof. Non-limiting examples of co-solvents for use in the detailing agent can include xylene, methyl isobutyl ketone, 3-methoxy-3-methyl-1-butyl acetate, ethyl acetate, butyl acetate, propylene glycol monomethyl ether, ethylene glycol mono tert-butyl ether, dipropylene glycol methyl ether, diethylene glycol butyl ether, ethylene glycol monobutyl ether, 3-Methoxy-3-Methyl-1-butanol, isobutyl alcohol, 1,4-butanediol, N,N-dimethyl acetamide, and combinations thereof. In some examples, the detailing agent can be mostly water. In a particular example, the detailing agent can be about 85 wt % water or more. In further examples, the detailing agent can be about 95 wt % water or more. In still further examples, the detailing agent can be substantially devoid of radiation absorbers. That is, in some examples, the detailing agent can be substantially devoid of ingredients that absorb enough radiation energy to cause the powder to fuse. In certain examples, the detailing agent can include colorants such as dyes or pigments, but in small enough amounts that the colorants do not cause the powder printed with the detailing agent to fuse when exposed to the radiation energy.

The detailing agent can also include ingredients to allow the detailing agent to be jetted by a fluid jet printhead. In some examples, the detailing agent can include jettability imparting ingredients such as those in the fusing agent described above. These ingredients can include a liquid vehicle, surfactant, dispersant, co-solvent, biocides, viscosity modifiers, materials for pH adjustment, sequestering agents, preservatives, and so on. These ingredients can be included in any of the amounts described above.

In some examples, the detailing agent can include a polar organic solvent having a boiling point from about 200° C. to about 320° C. in an amount from about 0.1 wt % to about 20 wt % with respect to the total weight of the detailing agent. In further examples, the detailing agent can include a dihydrazide antioxidant in an amount from about 0.1 wt % to about 10 wt %. In still further examples, the detailing agent can include both the polar organic solvent having a boiling point from about 200° C. to about 320° C. and the dihydrazide antioxidant.

Liquid Vehicles

The fluid agents of the present disclosure, e.g., fusing agent(s), hardening agent(s), coloring agent(s), detailing agent(s), or the like, can include various active ingredients, e.g., radiation absorber, hardener, colorant, detailing compound, etc. In these and other examples, the fluid agents can be formulated with a liquid vehicle and the active ingredient (s). The active ingredients can be as described in detail elsewhere herein. With respect to the liquid vehicle, such formulations can include the active ingredient(s) and water, co-solvent(s) present in total at from about 0.5 wt % to about 50 wt %, depending on the jetting architecture, e.g., thermal, piezo, etc. Further, in some examples, various liquid vehicles can include non-ionic, cationic, and/or anionic surfactants and can be present, ranging from about 0.01 wt % to about 10 wt %. In one example, the surfactant can be present in an amount from about 1 wt % to about 5 wt %. The liquid vehicle can include dispersants which may be applicable to disperse solids in the formulation, and if present, can be included in an amount from about 0.5 wt % to about 3 wt %. Other vehicle components that can be included may be in the form of biocides, viscosity modifiers, materials for pH adjustment, sequestering agents, preservatives, or the like. In one example, the liquid vehicle(s) can be predominantly water.

Classes of co-solvents that can be used can include organic co-solvents including aliphatic alcohols, aromatic alcohols, diols, glycol ethers, polyglycol ethers, caprolactams, formamides, acetamides, and long chain alcohols. Examples of such compounds include 1-aliphatic alcohols, secondary aliphatic alcohols, 1,2-alcohols, 1,3-alcohols, 1,5-alcohols, ethylene glycol alkyl ethers, propylene glycol alkyl ethers, higher homologs ($C_6$-$C_{12}$) of polyethylene glycol alkyl ethers, N-alkyl caprolactams, unsubstituted caprolactams, both substituted and unsubstituted formamides, both substituted and unsubstituted acetamides, and the like. Specific examples of solvents that can be used include, but are not limited to, 2-pyrrolidinone, N-methylpyrrolidone, 2-hydroxyethyl-2-pyrrolidone, 2-methyl-1,3-propanediol, tetraethylene glycol, 1,6-hexanediol, 1,5-hexanediol and 1,5-pentanediol.

Regarding the surfactant that may be present, a surfactant or surfactants can be used, such as alkyl polyethylene oxides, alkyl phenyl polyethylene oxides, polyethylene oxide block copolymers, acetylenic polyethylene oxides, polyethylene oxide (di)esters, polyethylene oxide amines, protonated polyethylene oxide amines, protonated polyethylene oxide amides, dimethicone copolyols, substituted amine oxides, and the like. The amount of surfactant added to the fusing agent may range from about 0.01 wt % to about 20 wt %. Suitable surfactants can include, but are not limited to, liponic esters such as Tergitol™ 15-S-12, Tergitol™ 15-S-7 available from Dow Chemical Company (Michigan), LEG-1 and LEG-7; Triton™ X-100; Triton™ X-405 available from Dow Chemical Company (Michigan); and sodium dodecylsulfate.

Various other additives can be employed to enhance certain properties of the fusing agent for specific applications. Examples of these additives are those added to inhibit the growth of harmful microorganisms. These additives may be biocides, fungicides, and other microbial agents, which can be used in various formulations. Examples of suitable microbial agents include, but are not limited to, NUOSEPT® (Nudex, Inc., New Jersey), UCARCIDE™ (Union carbide Corp., Texas), VANCIDE® (R.T. Vanderbilt Co., Connecticut), PROXEL® (ICI Americas, New Jersey), and combinations thereof.

Definitions

It is noted that, as used in this specification and the appended claims, the singular forms "a," "an," and "the" include plural referents unless the context clearly dictates otherwise.

As used herein, "average particle size" refers to a number average of the diameter of the particles for spherical particles, or a number average of the volume equivalent sphere diameter for non-spherical particles. The volume equivalent sphere diameter is the diameter of a sphere having the same volume as the particle. Average particle size can be measured using a particle analyzer such as the Mastersizer™ 3000 available from Malvern Panalytical. The particle analyzer can measure particle size using laser diffraction. A laser beam can pass through a sample of particles and the angular variation in intensity of light scattered by the particles can be measured. Larger particles scatter light at smaller angles, while small particles scatter light at larger angles. The particle analyzer can then analyze the angular scattering data to calculate the size of the particles using the Mie theory of light scattering. The particle size can be reported as a volume equivalent sphere diameter.

As used herein, the term "about" is used to provide flexibility to a numerical range endpoint by providing that a given value may be "a little above" or "a little below" the endpoint. The degree of flexibility of this term can be dictated by the particular variable and determined based on the associated description herein.

As used herein, a plurality of items, structural elements, compositional elements, and/or materials may be presented in a common list for convenience. However, these lists should be construed as though individual members of the list are individually identified as a separate and unique member. Thus, no individual member of such list should be construed as a de facto equivalent of any other member of the same list solely based on their presentation in a common group without indications to the contrary.

Concentrations, amounts, and other numerical data may be expressed or presented herein in a range format. It is to be understood that such a range format is used merely for convenience and brevity and thus should be interpreted flexibly to include the numerical values explicitly recited as the limits of the range, and also to include individual numerical values or sub-ranges encompassed within that range as if individual numerical values and sub-ranges are explicitly recited. As an illustration, a numerical range of "about 1 wt % to about 5 wt %" should be interpreted to include the explicitly recited values of about 1 wt % to about 5 wt %, and also to include individual values and sub-ranges within the indicated range. Thus, included in this numerical range are individual values such as 2, 3.5, and 4 and sub-ranges such as from 1-3, from 2-4, and from 3-5, etc. This same principle applies to ranges reciting a single numerical value. Furthermore, such an interpretation should apply regardless of the breadth of the range or the characteristics being described.

What is claimed is:

1. A 3D printing kit comprising:
   a powder bed material comprising from about 80 wt % to 100 wt % polymer particles, the polymeric particles including a polyalkylene backbone with both ethylene and propylene polymerized monomeric units, wherein from 2 mol % to 15 mol % of the polymerized monomeric units include a grafted side chain having an epoxide moiety;
   a fusing agent to selectively apply to the powder bed material, wherein the fusing agent comprises water and a radiation absorber that absorbs electromagnetic energy and converts the electromagnetic energy to heat; and
   a hardener to selectively apply to the powder bed material, wherein the hardener is present in the fusing agent or is included in a hardening agent that is separate from the fusing agent.

2. The 3D printing kit of claim 1, wherein the hardener is included in the fusing agent.

3. The 3D printing kit of claim 1, wherein the hardening agent is present and the hardener is included in the hardening agent.

4. The 3D printing kit of claim 1, wherein the polymeric particles have a weight average molecular weight from about 10,000 Mw to about 75,000 Mw and an average particle size from about 10 μm to about 150 μm.

5. The 3D printing kit of claim 1, wherein the polymeric particles have a weight average molecular weight from about 20,000 Mw to about 50,000 Mw and an average particle size from about 20 μm to about 75 μm.

6. The 3D printing kit of claim 1, wherein the radiation absorber is a metal dithiolene complex, carbon black, a near-infrared absorbing dye, a near-infrared absorbing pigment, metal nanoparticles, a conjugated polymer, or a combination thereof.

7. The 3D printing kit of claim 1, wherein the hardening agent includes water and from about 5 wt % to 50 wt % of the hardener which is selected from an amine hardener, a thiol hardener, an anhydride hardener, an isocyanate hardener, or a combination thereof.

8. The 3D printing kit of claim 1, further comprising a detailing agent comprising a detailing compound, wherein the detailing compound reduces the temperature of powder bed material onto which the detailing agent is applied.

9. The powder bed material of claim 1, wherein from 3 mol % to 10 mol % of the polymerized monomeric units includes the grafted side chain of the epoxide moiety.

10. The powder bed material of claim 1, wherein the polymeric particles are a reaction product of a polypropylene-b-polyethylene random copolymer and a glycidyl (meth)acrylate.

11. A method of 3D printing comprising:
    iteratively applying individual build material layers of polymer particles to a powder bed, the polymeric particles including a polyalkylene backbone with both ethylene and propylene polymerized monomeric units, wherein from 2 mol % to 15 mol % of the polymerized monomeric units include a grafted side chain having an epoxide moiety;
    based on a 3D object model, selectively jetting a fusing agent onto the individual build material layers, wherein the fusing agent comprises water and a radiation absorber that absorbs electromagnetic energy and converts the electromagnetic energy to heat;
    based on the 3D object model, selectively jetting a hardener onto the individual build material layers to cause epoxide moieties to open and become crosslinked, wherein the hardener is present in the fusing agent or separately jetted onto the individual build material layers as part of a separate hardening agent; and
    exposing the powder bed to electromagnetic energy to selectively fuse the polymer particles in contact with the radiation absorber at individual build material layers to form a 3D printed article.

12. The method of claim 11, wherein the 3D printed article formed is both physically fused by thermoplastic melting of particles and is chemically crosslinked at opened epoxy groups.

13. The method of claim 11, wherein the 3D printed article formed has a Young's Modulus of 3,000 MPa or more.

14. A 3D printing system comprising:
    a powder bed material comprising from about 80 wt % to 100 wt % polymer particles, the polymeric particles including a polyalkylene backbone with both ethylene and propylene polymerized monomeric units, wherein from 2 mol % to 15 mol % of the polymerized monomeric units include a grafted side chain having an epoxide moiety;
    a fusing agent to selectively apply to the powder bed material, wherein the fusing agent comprises water and a radiation absorber that absorbs electromagnetic energy and converts the electromagnetic energy to heat;
    a hardener to selectively apply to the powder bed material, wherein the hardener is present in the fusing agent or is included in a hardening agent that is separate from the fusing agent; and
    a radiant energy source positioned to expose a layer of powder bed material to the electromagnetic energy to selectively fuse the polymer particles in contact with the radiation absorber and thereby form a 3D printed article that thermally fused and chemically crosslinked.

15. The 3D printing system of claim 14, wherein the hardening agent is present and the hardener is included in the hardening agent.

\* \* \* \* \*